Patented Nov. 22, 1932

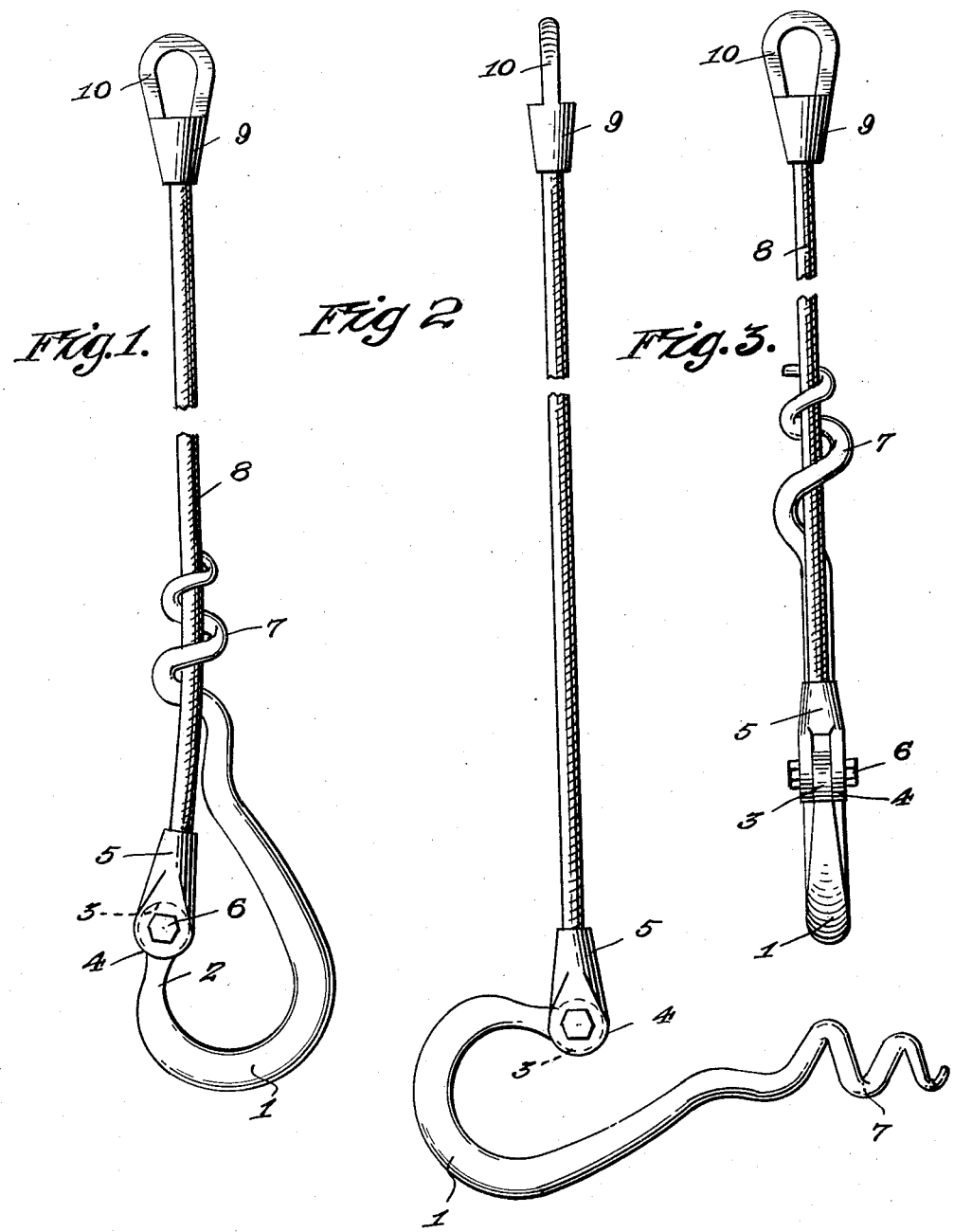

1,888,875

UNITED STATES PATENT OFFICE

ELDRIDGE E. LONG AND WILLIAM C. GOETZE, OF TROUTDALE, OREGON

FASTENING DEVICE

Application filed January 30, 1932. Serial No. 589,934.

This invention relates to fastening devices and its general object is to provide a cable hook that is primarily designed for easily, quickly and securely anchoring or fastening cables and the like without fear of the hook becoming casually unfastened even though the cable or the like becomes slack or loose.

A further object of the invention is to provide a cable hook of the character set forth, that is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which:

Figure 1 is a side view of my device with the hook arranged in closed position.

Figure 2 is a similar view with the hook arranged in open position.

Figure 3 is a front view thereof.

Referring to the drawing in detail, the reference numeral 1 indicates the body or curved portion of a hook, and 2 the shank thereof which as best shown in Figures 1 and 2 terminates in an eye 3 having flattened sides and adapted to be received between the apertured ears 4 of the socket member 5 and the hook is secured to the ears through the medium of a pivot pin 6.

From the body or curved portion 1, the hook is tapered and extends in spiral formation as indicated by the reference numeral 7.

Secured in the socket member 5 is one end of a strand 8 of flexible material such as a cable, while the opposite end of the strand 8 is likewise secured in a socket member 9 which has formed therewith a substantially U-shape member 10 for the purpose of securing the opposite end to any means desired.

From the above description and disclosure of the drawing, it will be obvious that we have provided a fastening device that can be utilized for easily and expeditiously securing a cable to an anchoring means, by merely inserting the spiral portion through the anchoring means, moving the hook on its pivot pin, and twisting or turning the strand 8 into the spiral portion as clearly shown in Figures 1 and 3.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A fastening device comprising a hook, a strand of flexible material, a socket member secured to one end of the strand, spaced apertured ears formed with the socket member, means for pivotally securing the shank of the hook between the ears, and a spiral portion formed with the hook to receive the strand with the latter passing through the convolutions thereof.

2. A fastening device of the character described comprising a hook, an eye formed with the shank thereof, a socket member, spaced apertured ears formed with the socket member and adapted to receive the eye between the same, a pivot pin passing through the ears and eye, a strand of flexible material secured in the socket member, said hook being tapered toward its free end, a spiral portion formed with the tapered portion and adapted to receive the strand of flexible material in a manner whereby the latter extends through the convolutions thereof.

In testimony whereof we affix our signatures.

ELDRIDGE E. LONG.
WILLIAM C. GOETZE.